Patented Feb. 24, 1942

2,274,058

UNITED STATES PATENT OFFICE 2,274,058

LONG-CHAIN ALKYL AMMONIUM METALLO-NITRITES AND PROCESS FOR THEIR MANUFACTURE

Max T. Goebel and Isaac F. Walker, Wilmington, Del., assignors to E. I. du Pont de Nemours & Company, Wilmington, Del., a corporation of Delaware No Drawing. Application May 13, 1939,
Serial No. 273,581

8 Claims. (Cl. 260—429)

This invention relates to complex coordination compounds, and more particularly to substituted ammonium metallonitrites derived from long-chain aliphatic amines.

It is well known that certain metal ions are able to form coordination complexes in which the normal combining power of the metal ion is increased through secondary or coordination valences. Cobalt, lead, platinum, chromium and mercury are some of the metals which exhibit this characteristic in such complex compounds as $K_3Co(NO_2)_6$, $K_3Pb_2(NO_2)_7.1\frac{1}{2}H_2O$, $Na_2PtCl_6$, $(Cr(H_2O)_6)Cl_3$, and $(NH_2Hg_2O)_2SO_4$. The complexes containing ammonia have been studied extensively because of the ease with which this substance can be coordinated, and it has been shown that the substituted ammonias, or amines, likewise form a wide variety of such compounds.

The metallonitrites of a number of amines are known, including those prepared from methylamine, ethylamine, aniline, toluidine, mono- and dibenzylamine and guanidine. These compounds are in general characterized by water solubility and in the case of those derived from the lower alkylamines by instability in the presence of moisture.

It is an object of this invention to prepare certain new and useful compounds. Another object is to prepare compounds that are stable in the presence of moisture. Still another object is to prepare oil-soluble, water-insoluble compounds having a high affinity for metallic surfaces. Another object is to prepare new and useful compounds having rust-proofing properties. Another object is to prepare new and useful compositions that have rust-proofing qualities. A further object is to develop a process for the treatment of ferrous metal surfaces to protect them from corrosion. Other objects will be apparent from the reading of the following description of the invention.

These objects are accomplished by reacting a compound having a complex metallonitrite anion with an aliphatic amine having at least one acyclic aliphatic radical of at least 8 carbon atoms, and recovering the coordination product formed. This coordination compound contains a complex metallonitrite anion and a substituted ammonium cation. The metallonitrite anion may contain more than one kind of metal ion, for example $BaFe(NO_2)_6^{--}$ and $CaNi(NO_2)_6^{--}$. The substituted ammonium cation is one of the following type

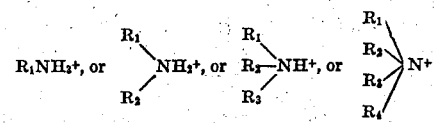

where $R_1$ is an acyclic hydrocarbon radical having a chain of at least 8 carbon atoms and where $R_2$, $R_3$, and $R_4$ are either aliphatic or aromatic radicals, it being preferable that they be hydrocarbon radicals. Compounds coming within the foregoing classification are stable and water-insoluble. They are especially adapted for use in coating ferrous metal surfaces as they form a coating which is of great value in retarding rusting or corrosion of said surfaces.

The following examples in which parts are by weight set forth certain well defined instances of the application of this invention. They are, however, not to be considered as limitations thereof since many modifications may be made without departing from the spirit and scope of this invention.

Example I

Fifty parts of hydrated cobaltous acetate, 110 parts of sodium nitrite and 10 parts of glacial acetic acid are added to 200 parts of water. Sodium cobaltinitrite is precipitated from this solution by addition of absolute alcohol, and is separated by filtration.

Eleven and five-tenths parts of the reddish-orange sodium cobaltinitrite is added to 20 parts of a mixture of amines obtainable by reacting ammonia with the alcohols obtained by catalytic hydrogenation of sperm oil, and 5 parts of glacial acetic acid in a mixture of 50 parts of 1:1 toluene-acetone and 25 parts of water. This mixture is agitated, an additional 50 parts of the toluene-acetone mixture is added, and the water layer is drawn off and discarded. The toluene-acetone solution is then evaporated to dryness on a steam bath and the product obtained is purified by recrystallization from methanol. The mixed alkyl substituted ammonium cobaltinitrites prepared in this manner are light orange in color, are soluble in a variety of organic solvents, and are stable in the presence of moisture. They have the general formula $(RNH_3)_3Co(NO_2)_6$, where R may correspond to the alkyl group in the alcohols obtained by the catalytic hydrogenation of sperm oil. These alcohols are chiefly octadecyl alcohol.

Example II

Fifty parts of hydrated cobaltous acetate and 100 parts of sodium nitrite are dissolved in 100 parts of water, and glacial acetic acid is added with stirring until no more gas is evolved. The solution is colored a deep red-brown at this point. One hundred five parts of n-dodecylamine is then added to the above solution, and an immediate reaction occurs, a thick paste being formed and a small amount of $NO_2$ being evolved. The paste is diluted immediately with cold water and the product separated by filtration. The orange-colored dodecyl ammonium cobaltinitrite

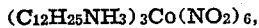
$$(C_{12}H_{25}NH_3)_3Co(NO_2)_6,$$

obtained in this way is washed several times with cold water and dried in the air at room temperature. This product is similar to that of Example I in solubility and stability characteristics.

Example III

Seventy-six parts of lead acetate and 70 parts of potassium nitrite are added to 500 parts of water and the precipitate which appears is redissolved with a small amount of acetic acid. Sixty parts of crude amines obtainable by reacting ammonia with the mixture of monohydric alcohols obtained from the catalytic hydrogenation of coconut oil is added to this solution, and the complex salt is then precipitated by the addition of potassium hydroxide. When the solid material is filtered off, a quantity of the amines is recovered in the filtrate, the proportions indicating that the dipotassium salt having the formula

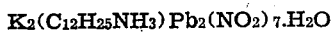
$$K_2(C_{12}H_{25}NH_3)Pb_2(NO_2)_7 \cdot H_2O$$

is the product obtained. The presence of a metallic cation in this compound reduces its oil solubility, but it can be dispersed successfully in various organic media and is stable in contact with water.

While cobalt forms particularly stable nitrite complexes, analogous compounds can be formed with a number of tervalent metals such as iron, nickel, bismuth, ruthenium, rhodium, and iridium. Many bivalent metals also produce compounds of this type, as, for example, copper, lead, mercury, cadmium, zinc, platinum, and palladium. All of these can be used to prepare the products of this invention, but for practical purposes it is preferred to use the common metals yielding complex nitrites which, as the alkali metal salts, are soluble in water and can be heated at moderate temperature without decomposition. Such a group comprises cobalt, nickel, lead, cadmium, and mercury, iron, copper, and zinc.

As indicated in the examples, the complex metallonitrites of this invention may either contain long-chain alkyl ammonium groups as cations, or there may be present both substituted ammonium radicals of this type and metallic ions such as sodium, potassium, barium, calcium and the heavy metals.

The substituted ammonium group is preferably derived from an aliphatic monoamine having at least one chain of at least eight carbon atoms, but may also contain aromatic groups as long as the primary requirement of one aliphatic chain of at least eight carbons is fulfilled. That is, the primary amines which can be used must be long-chain products containing at least eight carbon atoms, while the secondary, tertiary and quaternary ammonium compounds, which also may be used, may contain either aliphatic or aromatic carbon groups as long as one aliphatic chain of at least eight carbon atoms is present. The invention therefore includes such compounds as the dodecylammonium, 9,10-octadecenylammonium, ditetradecylammonium, tridecylammonium, hexadecyldimethylammonium, octadecyldibenzylammonium, hexadecylpyridinium and decamethylenediammonium salts. The long-chain alkylammonium group may be derived from either a pure mono- or diamine or a technical mixture such as "Lorol" amine or "Stenol" amine, which correspond respectively to the alkyl alcohols obtained by the catalytic hydrogenation of coconut oil acids and sperm oil. The amines containing from 8 to 24 carbon atom chains are ordinarily used because of availability and cost considerations, while those containing chains of 10 to 18 carbon atoms yield products which are particularly well suited for most applications where these compounds are employed.

Examples of compounds falling within the scope of this invention are as follows:

"Lorol" ammonium cobaltinitrite
Decylammonium cobaltinitrite
Tetradecylammonium nickel hexanitrite
Octodecylammonium cadmium tetranitrite
Dodecylammonium dipotassium lead heptanitrite
9,10-octadecenylammonium mercuric pentanitrite
Didodecylammonium lead tetranitrite
Tritetradecylammonium cobaltinitrite
Hexadecyldimethylammonium rhodium hexanitrite
Octylammonium cobaltinitrite
Octylammonium tetranitrito platinite
Dodecylammonium palladous tetranitrite
Tridecylammonium iridic hexanitrite
Octadecyldibenzylammonium ruthenium pentanitrite
Tetradecyltrimethylammonium zinc tetranitrite
Hexadecenylammonium cobaltic oxyoctonitrite
Dodecylammonium nickel cobaltinirite
Hexadecylpyridinium hexanitritobismuthite
Dodecyldiethylammonium cobaltinitrite
Tetradecylammonium barium iron hexanitrite
Tridecylammonium copper barium nitrite
Octylphenylammonium copper strontium nitrite
Dodecylpyridinium mercuric trinitrite
Pentadecylammonium bismuth nitrite
Dioctadecylammonium iron lead nitrite The products of this invention are particularly useful for preventing corrosion of metal surfaces and may be applied directly to ferrous metal surfaces as anti-corrodents or may be incorporated in metal-protective coating compositions such as drying oil paints, lubricating oils, and lubricants.

Although these compounds will usually be applied to metal surfaces by means of a solution using such well known processes as dipping, spraying, wiping, and brushing, it will be desirable at times to use other methods of application. A material which melts at reasonably low temperatures and which undergoes no decomposition in the region of its melting point may be applied in the liquid form without a diluent of any kind, provided that the application of the material is so regulated that the final protective film conforms to the desired thickness limits.

These compounds may also be applied to the metal surface as a finely divided solid and the protective layer be formed by fusing the solid particles to a continuous coating at a suitable temperature. The protective agent may also be emulsified or dispersed in a liquid which is not a true solvent and applied to metal surfaces in this form, with the evaporation of the carrier occurring subsequently. In some instances it has been found that oils of various types may serve as carriers for the protective agent, and in such cases it is not intended that the carrier be removed by evaporation as is the practice when solvents or dispersions are used.

When applied from solution, concentrations of from 2 to 10% are preferred although solutions containing 1 to 20% of these compounds may be used. Solvents which are preferred vary with the compounds but in general alcohols, ketones, and hydrocarbons, or mixtures thereof, are the most useful.

The rust-inhibitive power of nitrites is known, since soluble inorganic nitrites are often used in solution to protect water pipes and boilers in power plants and heating systems. Insoluble nitrites, such as potassium cobaltinitrite, have also been used as metal-protective pigments but with only indifferent success. The inorganic nitrites are not adapted for general use as protective treatments applied to steel sheet and wire as they possess little or no affinity for the metal and are easily washed or brushed off during handling and exposure. It was quite unexpected to find that the compounds covered by this invention were not only water stable but also strongly water repellent, and offer excellent protection against rusting when applied in extremely thin surface films to ferrous metals. They are superior to such materials as mineral oils and lanolin even when the latter are used in greater amounts, and have proved outstanding in preventing corrosion due to perspiration from the hands of operators when various metal parts are tested and inspected after manufacture.

When added to drying oil compositions, these products have demonstrated excellent rust inhibitive power. Small amounts of these complex metallonitrites may also be added to lubricating oils to increase their rust protective value, and such products are particularly valuable as gun oils and lubricants for fine machinery.

The compounds of this invention are particularly well adapted to the protection of ferrous metal articles, such as bolts, nuts, nails, wire, sheets, tools, fine machinery parts, bearings, cutlery, gears, fire arms, metallic cases, etc., and to the treatment of ferrous metal articles which have been provided with a surface coating of some other metal or alloy, such as chromium, copper, nickel, cadmium, zinc, brass, aluminum, tin, lead, etc. In addition to such uses, these compounds may be applied to the surfaces of other metals and alloys, particularly those used for structural shapes and articles of commerce such as rods, sheets, tubes, etc. Among such metals are zinc, brass, bronze, aluminum, tin, copper, pewter, lead, magnesium, cadmium, "duralumin," nickel, etc.

We claim:

1. An ammonium metallonitrite having at least one alkyl group of at least 8 carbon atoms.
2. An ammonium cobaltinitrite having at least one alkyl group of at least 8 carbon atoms.
3. An ammonium metallonitrite having at least one alkyl group of from 8 to 24 carbon atoms.
4. An ammonium metallonitrite having at least one alkyl group of from 10 to 18 carbon atoms.
5. A process which comprises reacting a compound yielding in aqueous solution a metallonitrite anion with an alkyl amine containing a carbon chain of at least 8 carbon atoms, in the presence of acetic acid.
6. Dodecyl ammonium cobaltinitrite.
7. The ammonium cobaltinitrite of the mixture of normal primary aliphatic amines having alkyl chains of the same carbon content and structure and mixed in the same proportion as the long aliphatic carbon chains of the acid portion of sperm oil.
8. The dipotassium salt of the ammonium lead heptanitrite of the mixture of normal primary aliphatic amines having alkyl chains of the same carbon content and structure and mixed in the same proportion as the long carbon chains of the acid portion of coconut oil.

MAX T. GOEBEL.
ISAAC F. WALKER.